US010255628B2

(12) United States Patent
Li et al.

(10) Patent No.: US 10,255,628 B2
(45) Date of Patent: Apr. 9, 2019

(54) ITEM RECOMMENDATIONS VIA DEEP COLLABORATIVE FILTERING

(71) Applicant: ADOBE SYSTEMS INCORPORATED, San Jose, CA (US)

(72) Inventors: Sheng Li, Malden, AS (US); Jaya Kawale, San Jose, CA (US)

(73) Assignee: Adobe Inc., San Jose, CA (US)

( * ) Notice: Subject to any disclaimer, the term of this patent is extended or adjusted under 35 U.S.C. 154(b) by 714 days.

(21) Appl. No.: 14/934,294

(22) Filed: Nov. 6, 2015

(65) Prior Publication Data
US 2017/0132509 A1  May 11, 2017

(51) Int. Cl.
*G06N 3/04* (2006.01)
*G06Q 30/06* (2012.01)

(52) U.S. Cl.
CPC ....... *G06Q 30/0631* (2013.01); *G06N 3/0427* (2013.01); *G06N 3/0454* (2013.01); *G06N 3/0472* (2013.01); *Y04S 10/54* (2013.01)

(58) Field of Classification Search
USPC ......................................................... 706/25
See application file for complete search history.

(56) References Cited

U.S. PATENT DOCUMENTS 9,202,178 B2* 12/2015 Hall ................... G06F 17/30598
9,681,250 B2*  6/2017 Luo ........................ H04S 7/303
9,798,980 B2* 10/2017 Sabah .................... G06N 5/048
9,805,098 B2* 10/2017 Sabah ................. G06F 17/3053
9,990,367 B2*  6/2018 Bowman ............... G06F 21/602
2015/0012467 A1*  1/2015 Greystoke ............ G06N 99/005
706/12
2015/0055783 A1*  2/2015 Luo .......................... H04S 5/00
381/17

(Continued)

OTHER PUBLICATIONS

Learning Optimal Ranking with Tensor Factorization for Tag Recommendation, Steffen Rendle, Leandro Balby Marinho, Alexandros Nanopoulos, Lars Schmidt-Thieme, Information Systems and Machine Learning Lab (ISMLL), Institute for Computer Science University of Hildesheim, Germany, KDD'09, Jun. 28-Jul. 1, 2009, ACM 978-1-60, pp. 727-736.*

(Continued)

*Primary Examiner* — Michael B Holmes
(74) *Attorney, Agent, or Firm* — Shook, Hardy & Bacon L.L.P.

(57) ABSTRACT

A deep collaborative filtering (DCF) approach is employed in a recommender system to provide item recommendations to users. The DCF approach combines deep learning models with matrix factorization based collaborative filtering. To provide item recommendations, a user-item rating matrix, user side information, and item side information are provided as input to a recommender system. The recommender system learns user latent factors and item latent factors by jointly: (1) decomposing the user-item rating matrix to extract latent factors, and (2) extracting latent factors from hidden layers of deep learning models using the user side information and item side information. The learned user latent factors and item latent factors are used to predict item ratings for missing ratings in the user-item rating matrix. The predicted item ratings are then used to select item recommendations for a given user, which are then communicated to a user device of the user.

20 Claims, 6 Drawing Sheets

(56) References Cited

U.S. PATENT DOCUMENTS

| | | | | |
|---|---|---|---|---|
| 2016/0148253 | A1* | 5/2016 | Kawale | G06Q 30/0247 |
| | | | | 705/14.46 |
| 2016/0180235 | A1* | 6/2016 | Sabah | G06F 17/3053 |
| | | | | 706/52 |
| 2016/0180402 | A1* | 6/2016 | Sabah | G06F 17/3053 |
| | | | | 705/14.66 |
| 2016/0203141 | A1* | 7/2016 | Sabah | G06F 17/3053 |
| | | | | 707/739 |
| 2016/0350834 | A1* | 12/2016 | Wilson | G06Q 30/0631 |
| 2017/0132509 | A1* | 5/2017 | Li | G06N 3/08 |
| 2017/0140262 | A1* | 5/2017 | Wilson | G06N 3/0427 |
| 2017/0140417 | A1* | 5/2017 | Li | G06Q 30/0243 |
| 2018/0075512 | A1* | 3/2018 | Bui | G06F 7/08 |

OTHER PUBLICATIONS

Fast maximum margin matrix factorization for collaborative prediction, Jasson D. M. Rennie, Massachusetts Institute of Technology, Cambridge, MA, Nathan Srebro, University of Toronto, Toronto, Proceeding ICML '05 Proceedings of the 22nd international conference on Machine learning, pp. 713-719, Aug. 7-11, 2005, ACM.*
Learning Attribute-to-Feature Mappings for Cold-Start Recommendations, 2010 IEEE International Conference on Data Mining, Zeno Gantner, Lucas Drumond, Christoph Freudenthaler, Steffen Rendle and Lars Schmidt-Thieme, Machine Learning Group, University of Hildesheim, 1550-4786/10 2010 IEEE DOI 10.1109/ICDM.2010.129.*
Probabilistic Matrix Factorization Ruslan Salakhutdinov and Andriy Mnih Department of Computer Science, University of Toronto Mar. 2008, pp. 1-8.*
Collaborative Filtering and Deep Learning Based Recommendation System for Cold Start Items, Jian Wei, Jianhua He, Kai Chen, Yi Zhou, Zuoyin Tang School of Engineering and Applied Science, Aston University, Birmingham, UK pp. 1-29.*
SoRec: Social Recommendation Using Probabilistic Matrix Factorization Hao Ma, Haixuan Yang, Michael R. Lyu, Irwin King Dept. of Computer Science and Engineering The Chinese University of Hong Kong pp. 931-940 CIKM '08 Proceedings of the 17th ACM conference on Information and knowledge management Oct. 2008.*
Deep Neural Networks for YouTube Recommendations Paul Covington, Jay Adams, Emre Sargin, Google, pp. 191-198 RecSys '16 Proceedings of the 10th ACM Conference on Recommender Systems Sep. 15-19, 2016.*
Xiaoyuan Su and Taghi M. Khoshgoftaar. A survey of collaborative filtering techniques. Adv. Artificial Intelligence, 2009.
Yehuda Koren, Robert M. Bell, and Chris Volinsky. Matrix factorization techniques for recommender systems. IEEE Computer, 42(8):30-37, 2009.
Sotirios Chatzis. Nonparametric bayesian multitask collaborative filtering. In CIKM, pp. 2149-2158, 2013.
Ruslan Salakhutdinov and Andriy Mnih. Probabilistic matrix factorization. In NIPS, 2007.
Hao Ma, Dengyong Zhou, Chao Liu, Michael R. Lyu, and Irwin King. Recommender systems with social regularization. In WSDM, pp. 287-296, 2011.
Ajit Paul Singh and Geoffrey J. Gordon. Relational learning via collective matrix factorization. In KDD, pp. 650-658, 2008.
Ajit Paul Singh and Geoffrey J. Gordon. A bayesian matrix factorization model for relational data. CoRR, abs/1203.3517, 2012.
Geoffrey E Hinton and Ruslan R Salakhutdinov. Reducing the dimensionality of data with neural networks. Science, 313(5786):504-507, 2006.
Geoffrey Hinton, Simon Osindero, and Yee-Whye Teh. A fast learning algorithm for deep belief nets. Neural computation, 18(7):1527-1554, 2006.
Ruslan Salakhutdinov, Andriy Mnih, and Geoffrey E. Hinton. Restricted boltzmann machines for collaborative filtering. In ICML, pp. 791-798, 2007.
Kostadin Georgiev and Preslav Nakov. A non-iid framework for collaborative filtering with restricted boltzmann machines. In ICML, pp. 1148-1156, 2013.
Xinxi Wang and Ye Wang. Improving content-based and hybrid music recommendation using deep learning. In ACM MM, pp. 627-636, 2014.
Aäron Van Den Oord, Sander Dieleman, and Benjamin Schrauwen. Deep content-based music recommendation. In NIPS, pp. 2643-2651, 2013.
Tran The Truyen, Dinh Q. Phung, and Svetha Venkatesh. Ordinal boltzmann machines for collaborative filtering. In UAI, pp. 548-556, 2009.
Hao Wang, Naiyan Wang, and Dit-Yan Yeung. Collaborative deep learning for recommender systems. CoRR, abs/1409.2944, 2014.
Minmin Chen, Zhixiang Eddie Xu, Kilian Q. Weinberger, and Fei Sha. Marginalized denoising autoencoders for domain adaptation. In ICML, 2012.
James Bennett and Stan Lanning. The netflix prize. In Proceedings of KDD cup and workshop, p. 35, 2007.
Rahul Mazumder, Trevor Hastie, and Robert Tibshirani. Spectral regularization algorithms for learning large incomplete matrices. The Journal of Machine Learning Research, 11:2287-2322, 2010.
Daniel D Lee and H Sebastian Seung. Algorithms for non-negative matrix factorization. In NIPS, pp. 556-562, 2001.
Ruslan Salakhutdinov and Andriy Mnih. Bayesian probabilistic matrix factorization using markov chain monte carlo. In ICML, pp. 880-887, 2008.
Minjie Xu, Jun Zhu, and Bo Zhang. Fast max-margin matrix factorization with data augmentation. ICML, 2013.
Jianping Shi, Naiyan Wang, Yang Xia, Dit-Yan Yeung, Irwin King, and Jiaya Jia. SCMF: sparse covariance matrix factorization for collaborative filtering. In IJCAI, 2013.
Ryan Prescott Adams, George E Dahl, and Iain Murray. Incorporating side information in probabilistic matrix factorization with gaussian processes. In UAI, pp. 1-9, 2010.
Tinghui Zhou, Hanhuai Shan, Arindam Banerjee, and Guillermo Sapiro. Kernelized probabilistic matrix factorization: Exploiting graphs and side information. In SDM, pp. 403-414, 2012.
Tong Zhao, Julian J. McAuley, and Irwin King. Leveraging social connections to improve personalized ranking for collaborative filtering. In CIKM, pp. 261-270, 2014.
Ian Porteous, Arthur U. Asuncion, and Max Welling. Bayesian matrix factorization with side information and dirichlet process mixtures. In AAAI, 2010.
Yong-Deok Kim and Seungjin Choi. Scalable variational bayesian matrix factorization with side information. In AISTATS, pp. 493-502, 2014.
Sunho Park, Yong-Deok Kim, and Seungjin Choi. Hierarchical bayesian matrix factorization with side information. In IJCAI, 2013.
Liang Hu, Jian Cao, Guandong Xu, Longbing Cao, Zhiping Gu, and Can Zhu. Personalized recommendation via cross-domain triadic factorization. In WWW, pp. 595-606, 2013.
Aditya Krishna Menon, Krishna Prasad Chitrapura, Sachin Garg, Deepak Agarwal, and Nagaraj Kota. Response prediction using collaborative filtering with hierarchies and side-information. In KDD, pp. 141-149, 2011.
Liang Hu, Jian Cao, Guandong Xu, Longbing Cao, Zhiping Gu, and Wei Cao. Deep modeling of group preferences for group-based recommendation. In AAAI, pp. 1861-1867, 2014.
Yuanxin Ouyang, Wenqi Liu, Wenge Rong, and Zhang Xiong. Autoencoder-based collaborative filtering. In ICONIP, pp. 284-291, 2014.
Yifan Hu, Yehuda Koren, and Chris Volinsky. Collaborative filtering for implicit feedback datasets. In ICDM, pp. 263-272, 2008.
Koray Kavukcuoglu, Marca ÄŹAurelio Ranzato, Rob Fergus, and Yann Le-Cun. Learning invariant features through topographic filter maps. In CVPR, pp. 1605-1612. IEEE, 2009.
Honglak Lee, Peter Pham, Yan Largman, and Andrew Y Ng. Unsupervised feature learning for audio classification using convolutional deep belief networks. In NIPS, pp. 1096-1104, 2009.
Pascal Vincent, Hugo Larochelle, Yoshua Bengio, and Pierre-Antoine Manzagol. Extracting and composing robust features with denoising autoencoders. In ICML, pp. 1096-1103. ACM, 2008.

(56) References Cited

OTHER PUBLICATIONS

Zhi-Qin Yu, Xing-Jian Shi, Ling Yan, and Wu-Jun Li. Distributed stochastic ADMM for matrix factorization. In CIKM, pp. 1259-1268, 2014.

Yehuda Koren. Factorization meets the neighborhood: a multifaceted collaborative filtering model. In KDD, pp. 426-434, 2008.

Hao Ma. An experimental study on implicit social recommendation. In SIGIR, pp. 73-82, 2013.

Fangfang Li, Guandong Xu, and Longbing Cao. Coupled item-based matrix factorization. In WISE, pp. 1-14, 2014.

Amr Ahmed, Abhimanyu Das, and Alexander J. Smola. Scalable hierarchical multitask learning algorithms for conversion optimization in display advertising. In WSDM, pp. 153-162, 2014.

* cited by examiner

ITEM RECOMMENDATIONS VIA DEEP COLLABORATIVE FILTERING

BACKGROUND

Recommendation is a fundamental problem that has gained utmost importance in the modern era of information overload. The goal of recommendation is to help a user find a potentially interesting item from a large repository of items. Recommendation systems are widely used in modern websites in various contexts to target customers and provide them with useful information (for example, Amazon, Google News, Netflix, Last.fm, etc.). A widely used setting of recommendation systems is to predict how a user would rate an item (such as a movie) if only given the past rating history of the users. Many classical recommendation methods have been proposed during the last decade, and the two broad categories of recommendation systems are content filtering approaches and collaborative filtering methods. The collaborative filtering methods have attracted more attention due to their impressive performance. Matrix factorization plays a crucial role in collaborative filtering methods and has emerged as a powerful tool to perform recommendations in large datasets.

Learning effective latent factors plays an important role in matrix factorization based collaborative filtering methods. Traditional matrix factorization methods for collaborative filtering directly learn the latent factors from the user-item rating matrix (i.e., collection of item ratings given by users). One of the main challenges faced by these systems is to provide a rating when a new user or new item arrives in the system, also known as the cold start problem. The cold start problem is circular in nature as the system will not recommend an item unless it has some ratings for it, and unless the system recommends the item, the system may not get ratings for the item. Another practical challenge is learning the appropriate latent factors when the rating matrix is sparse, which is often the case in many real world scenarios.

In order to overcome these challenges, researchers have suggested incorporating additional sources of information about the users or items, also known as side information. This side information can be obtained from user profiles and item profiles, and may include any number of features regarding the users and items, such as, for example, demographics of a user, genre of a movie, etc. The user demographics could be used to infer the relationships between the users, and similarly, the item similarity can be used to automatically assign ratings to new items. The use of side information to aid matrix factorization has been successfully applied by various prior works. These methods, however, only utilize the side information as regularizations in the model, and the learned latent factors may not be very effective due to the sparse nature of the ratings and the side information. In order to make matrix factorization based methods effective in such a setting, it is highly desirable to learn and extract discriminative features from the datasets.

SUMMARY

Embodiments of the present invention generally relate to a deep collaborative filtering approach in a recommender system that tightly couples matrix factorization based collaborative filtering with deep feature learning. The deep collaborative filtering approach described herein addresses the cold-start problem, while being computationally efficient and scalable and providing improved performance when compared to prior state-of-art solutions. In accordance with embodiments of the present invention, a user-item rating matrix, user side information, and item side information are provided as input to a recommender system. The recommender system learns user latent factors and item latent factors by jointly: (1) decomposing the user-item rating matrix to extract latent factors from the user-item rating matrix, and (2) extracting latent factors from hidden layers of deep learning models using the user side information and item side information as input layers. Predicted item ratings are generated for missing ratings in the user-item rating matrix using the user latent factors and item latent factors. The recommender system selects item recommendations for a user based on the predicted item ratings. The item recommendations are then provided to the user by communicating the item recommendations, via a communication network, to a user device associated to the user.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
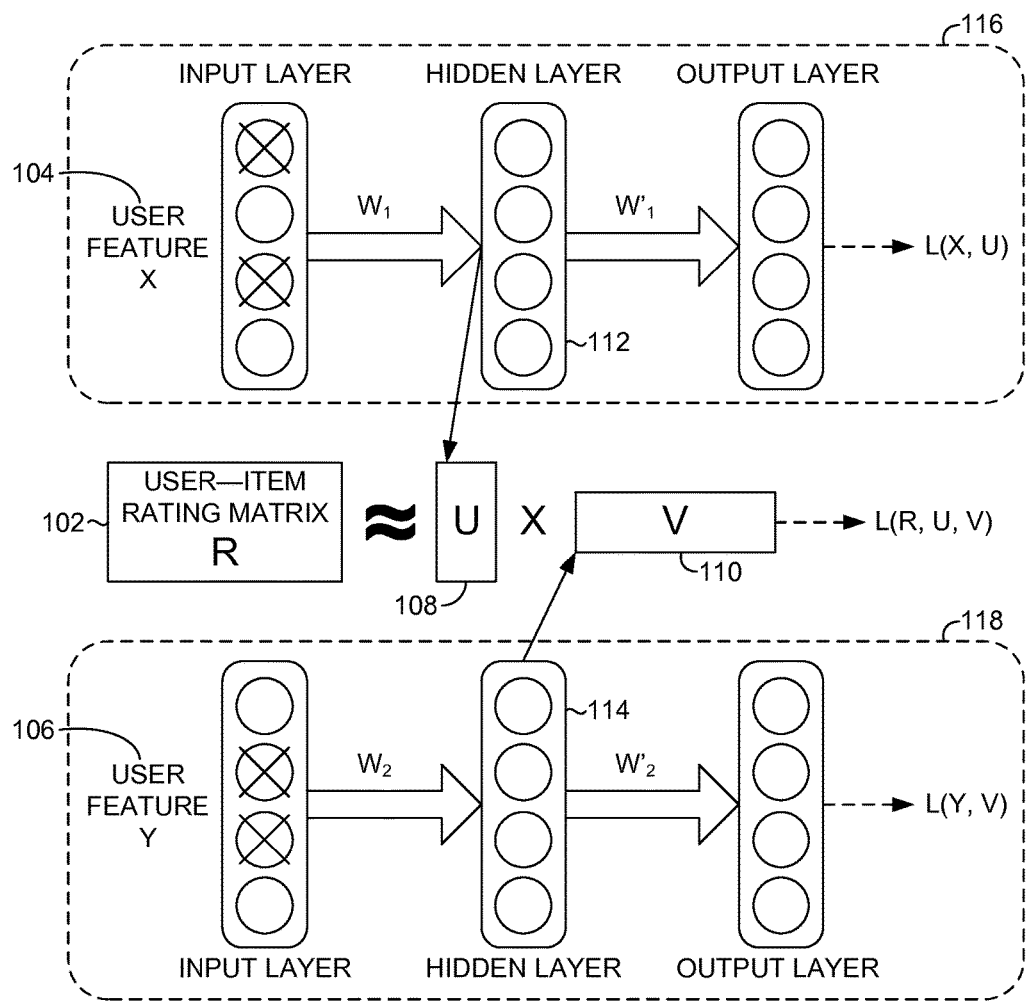
FIG. 1 is a diagram illustrates the deep collaborative framework used by a recommender system in accordance with embodiments of the present invention.

The importance of accurate recommendation techniques motivated by wide ranging applications has fuelled a great amount of academic as well as industrial research in this area. Currently, most recommender systems use matrix factorization based collaborative filtering approaches. However, matrix factorization methods suffer from the cold start problem (i.e., what recommendations to make when a new user/item arrives in the system). Another issue often present in many real world applications is the problem of data sparsity or reduced coverage. Incorporating side information, such as user and item features, has helped to alleviate the cold start problem but these approaches still suffer when the side information is sparse.

The application of deep learning models to the task of collaborative filtering is very new and there are not many attempts in this direction. As used herein, deep learning or deep learning models refer to neural networks with one or more hidden layers. Researchers have invested in modifying deep learning algorithms like Restricted Botzmann Machines or Convolutional Neural Networks or Deep Belief Networks directly for the task of collaborative filtering. These approaches mainly modify the deep learning algorithms for the task of collaborative filtering and do not directly couple matrix factorization with deep learning models. More recently, researchers have proposed a hierarchical Bayesian model called collaborative deep learning (CDL) which tightly couples stacked denoising autoencoders (SDA) and collaborative topic regression (CTR). However, the CDL approach is relatively computationally inefficient and not highly scalable. Additionally, the CDL approach only extracts deep features for items and does not learn deep features for both items and users.

Accordingly, embodiments of the present disclosure address these technological problems of recommender systems by introducing a model for collaborative filtering, referred to herein as deep collaborative filtering (DCF), which tightly couples matrix factorization based collaborative filtering with deep learning. The DCF approach models the mappings between the latent factors used in collaborative filtering and the latent layers in deep learning models. Particular embodiments combine probabilistic matrix factorization (PMF) with marginalized denoising autoencoders (mDA). The scalability and low computational cost of the mDA makes it a highly attractive deep learning tool. However, mDA is a new method that has only been introduced for specific applications (e.g., image classification), and there has been no work on how to combine mDA with matrix factorization or more generally combining matrix factorization and deep learning using a framework as described herein. The combined framework leads to a parsimonious fit over the latent factors as indicated by its improved performance in comparison to prior state-of-art models.

Some embodiments of the present invention provide a number of advantages over the CDL approach discussed above in a number of significant ways. First, CDL utilizes a Bayesian formulation of SDA, while some embodiments herein employ a more efficient architecture, namely mDA. One advantage of using mDA is computational efficiency. Unlike SDA used in CDL that requires learning parameters (i.e., weights applied to hidden layers) through optimization, mDA computes its parameters (namely mapping functions) in closed form and is thus highly efficient and scalable. Next, the generative process of CDL consists of drawing samples for CDL using an expectation maximization (EM)-style algorithm for obtaining the MAP estimates of Bayesian SDA and thus has to learn a large number of parameters. Some embodiments herein use mDA for learning the features and stochastic gradient descent algorithm to learn the latent factors and hence this approach is computationally more efficient and highly scalable since, among other things, it uses a closed form solution as opposed to optimization as in CDL. Further, CDL extracts deep features only for items, whereas embodiments herein learn deep features for both items and users, which provides better latent factors that achieve higher prediction accuracy.

As previously explained, embodiments of the present invention are directed to a deep collaborative filtering (DCF) framework, which unifies deep learning models with matrix factorization based collaborative filtering. Since a number of notations will be used herein to describe the DCF framework, a summary of the notations is provided below in Table 1.

TABLE 1

Summary of Notations

| Notation | Description |
| --- | --- |
| m | Number of users |
| n | Number of items |
| d | Dimension of latent factors |
| p | Dimension of user features |
| q | Dimension of item features |
| $R \in \mathbb{R}^{m \times n}$ | Rating matrix |
| $U \in \mathbb{R}^{m \times d}$ | Latent factors of users |
| $V \in \mathbb{R}^{n \times d}$ | Latent factors of items |
| $X \in \mathbb{R}^{p \times m}$ | Side information of users |
| $Y \in \mathbb{R}^{q \times n}$ | Side information of items |
| $W \in \mathbb{R}^{p \times p}$ | Mapping function in autoencoder |
| $P \in \mathbb{R}^{p \times d}$ | Projection matrix |

FIG. 1 illustrates the DCF framework. DCF is a hybrid model, which makes use of a user-item rating matrix R 102, user side information X 104, and item side information Y 106 and bridges together matrix factorization and feature learning. The user-item rating matrix R 102 comprises a matrix identifying item ratings given to various items by various users. Each item rating provides an indication of a particular user's interest in or assessment of a particular item. Item ratings may be provided for any of a variety of different types of items, such as physical products, services, and digital content (e.g., digital music, digital movies, news content, advertisements). In some embodiments, the item ratings are numerical representations, such as a rating on scale (e.g., 1-5). In other embodiments, the item ratings are a binary indication of a user's assessment, such as an indication of a "like" or "dislike." In still further embodiments, the item ratings represent whether a user interacted with a particular item, such as clicking on a link for a news story or an advertisement.

As shown in FIG. 1, given the user-item rating matrix R 102, the user side information X 104 and the item side information Y 106, DCF jointly decomposes the user-item rating matrix R 102 and learns latent factors (i.e., U 108 and V 110) from the user side information X 104 and the item side information Y 106. In particular, the latent features U 108 and V 110 are extracted from the hidden layers 112 and 114 of deep learning models 116 and 118, respectively. The following formulation provides a general framework:

$$\arg\min_{U,V} l(R, U, V) + \beta(\|U\|_F^2 + \|V\|_F^2) + \gamma \mathcal{L}(X, U) + \delta \mathcal{L}(Y, V) \quad \text{Equation (1)}$$

where β, γ, and δ are trade-off parameters.

There are two key components of the DCF framework: (i) the function l(R,U,V) for decomposing the rating matrix R into the two latent matrices; and (ii) the function L(X,U) and L(Y,V) that connects the user/item contextual features with the latent factors. The first component derived through matrix factorization extracts latent knowledge from the rating matrix. The second component devised using deep learning models establishes connections of the side information with the latent factors.

Figure 2:
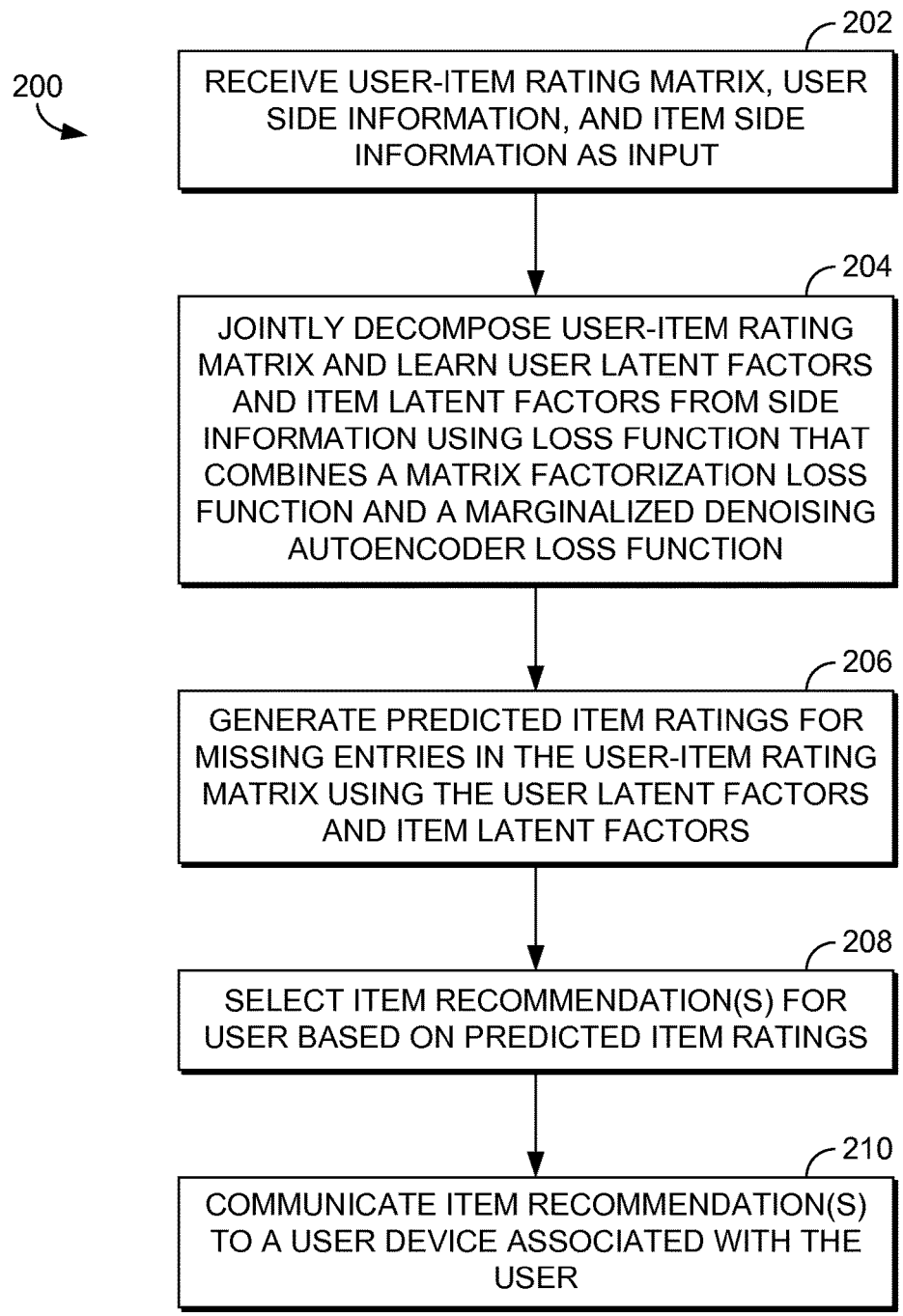
FIG. 2 is a flow diagram showing a method for utilizing the deep collaborative filtering framework in a recommender system to provide recommendations for a given user in accordance with an embodiment of the present invention.

FIG. 2 provides a flow diagram illustrating a method 200 for utilizing the DCF framework in a recommender system to provide recommendations for a given user. Each block of the method 200 and any other method discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 200 may be performed using a computing device, such as the computing device 600 of FIG. 6.

As shown at block 202, a user-item rating matrix, user side information, and item side information are received as inputs. The process at block 204 then jointly decomposes the user-item rating matrix and learns user latent factors and item latent factors from the user side information and item side information using a loss function (e.g., equation (1) above) that combines a matrix factorization loss function and mDA loss function.

As can be understood, the original user-item rating matrix received at block 202 has missing entries because not all users have rated all items in the matrix. Predicted item ratings for missing entries are generated using the user latent factors and the item latent factors, as shown at block 206. As noted above, the item ratings in the input user-item rating matrix may take a variety of forms, such as, for instance, a numerical rating, binary rating, or indication of a user action (such as a click on a link). As such, the predicted item ratings will be of the form of the item ratings of the input user-item rating matrix. It should be understood that in the event the item ratings are an indication of a user action, the predicted item ratings will comprise response predictions (i.e., a likelihood regarding whether that action will be performed for each item).

Item recommendations are selected for a particular user based on at least some of the predicted item ratings for that particular user, as shown at block 208. For instance, N items having the highest predicted item ratings for that user may be selected for recommendation. The selected item recommendations are communicated over a communications network from the recommender system (e.g., which may reside on a server) to a user device associated with the user, as shown at block 210.

Some embodiments of DCF are directed to combining probabilistic matrix factorization (PMF) with mDA. The motivations of doing this are two-folds. First, PMF is a widely applied collaborative filtering approach with excellent performance, and mDA is a powerful tool in extracting high-level features from raw inputs. The combination of the two leverages their benefits for learning even richer models.

Let $\overline{X} \in \mathbb{R}^{p \times cm}$ and $\overline{Y} \in \mathbb{R}^{q \times cn}$ denote the c-times repeated versions of X and Y respectively and let $\tilde{X}$ and $\tilde{Y}$ denote their corrupted versions. The following loss function of PMF may be used to decompose the rating matrix R:

$$l(R,U,V) = \|A \odot (R - UV^T)\|_F^2 \qquad \text{Equation (2)}$$

where A is the indicator matrix indicating the non-empty entries in R and $\odot$ denotes the Hadamard or point-wise product. The objective function of mDA-CF is formulated as follows:

$$\arg\min_{U,V,W_1,W_2,P_1,P_2} \mathcal{L}_U(W_1, P_1, U) + \mathcal{L}_V(W_2, P_2, V) + \qquad \text{Equation (3)}$$

$$\alpha \|A \odot (R - UV^T)\|_F^2 + \beta(\|U\|_F^2 + \|V\|_F^2)$$

where:

$$\mathcal{L}_U(W_1, P_1, U) = \|\overline{X} - W_1\tilde{X}\|_F^2 + \lambda\|P_1 U^T - W_1 X\|_F^2$$

$$\mathcal{L}_V(W_2, P_2, V) = \|\overline{Y} - W_2\tilde{Y}\|_F^2 + \lambda\|P_2 V^T - W_2 Y\|_F^2,$$

and where $W_1 \in \mathbb{R}^{p \times p}$ and $W_2 \in \mathbb{R}^{q \times q}$ and are reconstruction mappings, $P_1 \in \mathbb{R}^{p \times d}$ and $P_2 \in \mathbb{R}^{q \times d}$ are projection matrices, $\alpha$, $\beta$, and $\lambda$ are trade-off parameters. Note that $\gamma$ and $\delta$ in equation (1) have been set to 1 in equation (3) for simplicity.

The first term in $\mathcal{L}_U(W_1, P_1, U)$ denotes the learning process in the mDA. It measures the reconstruction error between input user features $\overline{X}$ and the mapped features of corrupted inputs, i.e., $W_1 \tilde{X}$. $W_1$ is the learned mapping that is expected to minimize the loss. The second term connects the hidden layer feature $W_1 X$ and the latent factor U. Generally, the latent factor has much lower dimension than the raw features. Therefore, a low-dimensional projection $P_1$ is added that maps latent factor to the feature space.

Although the optimization problem in equation (3) is not jointly convex in all the variables, it is convex to each of them when fixing the others. Hence, each of the variables in equation (3) can be alternately optimized. The detailed procedures are provided below.

First, a solution is derived to solve $W_1$ and $W_2$. By ignoring the variables irrelevant to $W_1$, the objective function of equation (3) can be rewritten as:

$$\arg\min_{W_1} \|\overline{X} - W_1\tilde{X}\|_F^2 + \lambda\|P_1 U^T - W_1 X\|_F^2 \qquad \text{Equation (4)}$$

The optimal solution below is obtained by considering the infinitely many copies of noisy data:

$$W_1 = E[S_1]E[Q_1]^{-1} \qquad \text{Equation (5)}$$

where $S_1 = \overline{X}\tilde{X}^T + \lambda P_1 U^T X^T$ and $Q_1 = \overline{X}\tilde{X}^T + \lambda XX^T$. An efficient solver for solving the expectations $E[S_1]$ and $E[Q_1]$ is provided in Minmin Chen et al., Marginalized Denoising Autoencoders for Domain Adaptation, in *ICML*, 2012.

Similarly, the closed-form solution of $W_2$ is derived as:

$$W_2 = E[S_2]E[Q_2]^{-1} \qquad \text{Equation (6)}$$

where $S_2 = \overline{Y}\tilde{Y}^T + \lambda P_2 V^T Y^T$ and $Q_1 = \overline{Y}\tilde{Y}^T + \lambda YY^T$.

Next, by dropping the irrelevant variables with respect to $P_1$, the objective function becomes:

$$\arg\min_{P_1} \lambda\|P_1 U^T - W_1 X\|_F^2 \qquad \text{Equation (7)}$$

The closed-formed solution is obtained as:

$$P_1 = W_1 XU(U^T U)^{-1} \qquad \text{Equation (8)}$$

Similarly, the optimal solution of $P_2$ is:

$$P_2 = W_2 YV(V^T U)^{-1} \qquad \text{Equation (9)}$$

To solve for the latent factors U and V, stochastic gradient descent is used. In particular, when other variables irrelevant to U and V are fixed, we use f(U,V) to denote the objective in equation (3). The update rules are:

$$u_i = u_i - \gamma \frac{\partial}{\partial u_i} f(U, V), \quad \text{Equation (10)}$$

$$v_j = v_j - \gamma \frac{\partial}{\partial v_j} f(U, V) \quad \text{Equation (11)}$$

where γ is the learning rate, and the detailed derivatives are defined as:

$$\frac{\partial f(U, V)}{\partial u_i} = \quad \text{(Equation 12)}$$

$$\lambda(P_1^T(P_1 u_i - (W_1 X)_i)) + \beta u_i - \alpha \sum_{(i,j) \in \mathcal{A}} (R_{i,j} - u_i v_j^T) v_j.$$

$$\frac{\partial f(U, V)}{\partial v_j} = \quad \text{(Equation 13)}$$

$$\lambda(P_2^T(P_2 v_j - (W_2 Y)_j)) + \beta v_j - \alpha \sum_{(i,j) \in \mathcal{A}} (R_{i,j} - u_i v_j^T) u_i.$$

Figure 3:
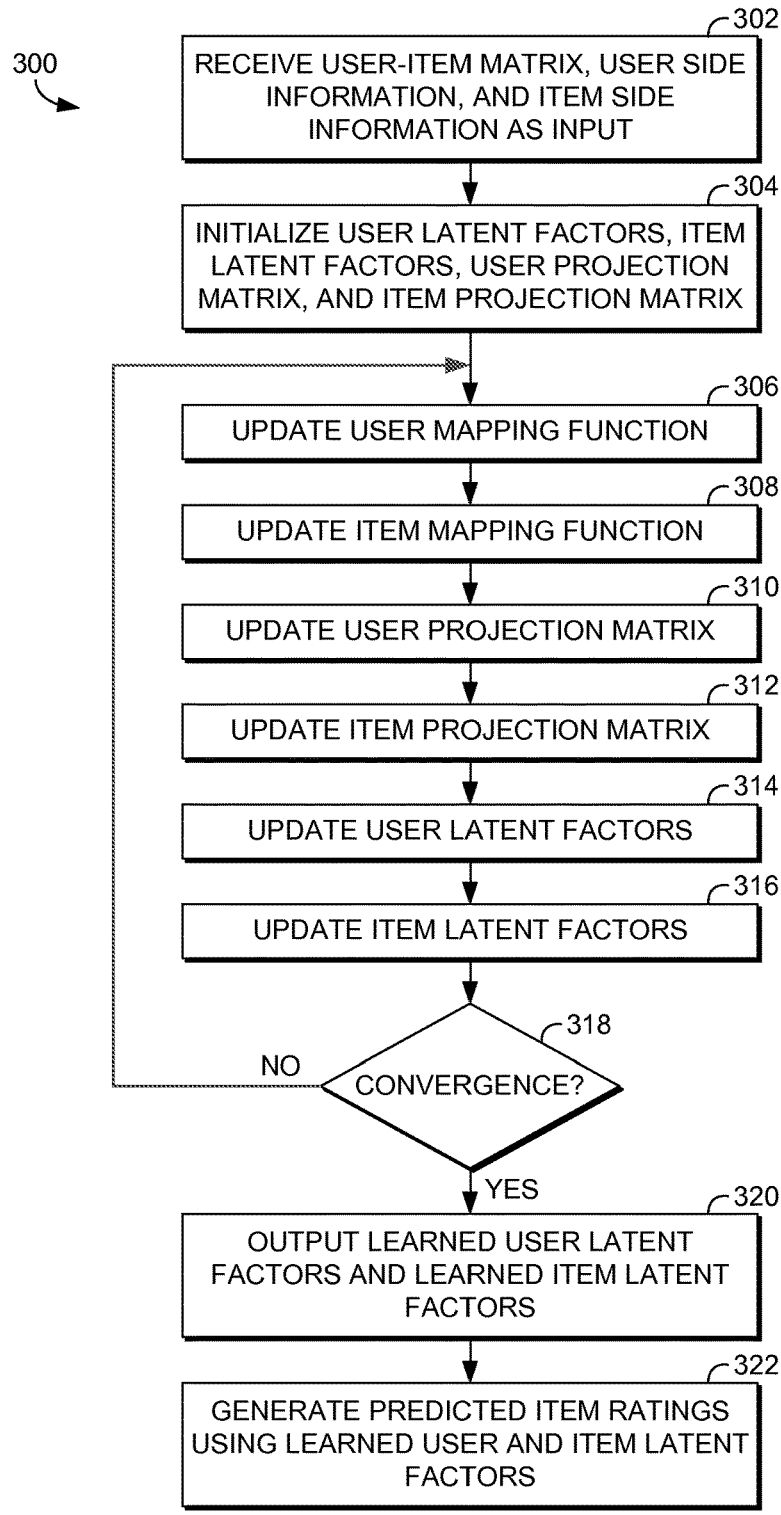
FIG. 3 is a flow diagram showing a method for determining user latent factors and item latent factors using a deep collaborative filtering approach combining probabilistic matrix factorization with marginalized denoising autoencoders in accordance with embodiments of the present invention.

Turning now to FIG. 3, a flow diagram is provided illustrating a method 300 for determining user latent factors and item latent factors using a DCF approach combining PMF with mDA. As shown at block 302, input is received that includes a user-item rating matrix, user side information, and item side information. Additionally, trade-off parameters may also be received at block 302. User latent factors, item latent factors, a user projection matrix, and an item projection matrix are initialized, as shown at block 304.

As shown in FIG. 3, the following steps are repeated until convergence. Convergence is considered to occur when the difference between the output of the objective function from the current run and the output from a previous run satisfies a certain threshold, which may be configurable (e.g., $10^{-6}$ could be used as the threshold in some embodiments). A user mapping function is updated as a function of the user side information, the user latent factors, and the user projection matrix, as shown at block 306. This may be performed using equation (5). An item mapping function is updated at block 308 as a function of the item side information, the item latent factors, and the item projection matrix. This may be performed using equation (6). The user projection matrix is updated at block 310 as a function of the user side information, the user mapping function, and the user latent factors. This may be performed using equation (8). The item projection matrix is updated at block 312 as a function of the item side information, the item mapping function, and the item latent factors. This may performed using equation (9). The user latent factors are updated at block 314 as a function of the user side information, the user projection matrix, and the user mapping function. This may be performed using equation (10). The item latent factors are updated at block 316 as a function of the item side information, the item projection matrix, and the item mapping function. This may be performed using equation (11).

Upon convergence being determined at block 318, learned user latent factors and learned item latent factors are outputted, as shown at block 320. The learned user latent factors and learned item latent factors are then used to generate predicted item ratings for missing entries in the user-item rating matrix, as shown at block 322.

The above approach can be summarized in Algorithm 1 shown below:

---
Algorithm 1: mDA-CF Algorithm

Input: Rating matrix R, user side information X, item side information Y, trade-off parameters λ, α, β
Output: Latent factors U, V
1: Initialize U, V, $P_1$, and $P_2$;
2: while validation error decreases, do
3:     Update $W_1$ using equation (5)
4:     Update $W_2$ using equation (6)
5:     Update $P_1$ using equation (8)
6:     Update $P_2$ using equation (9)
7:     for each observed $R_{ij}$, do
8:         Update $u_i$ using equation (10)
9:         Update $v_j$ using equation (11)
10:    end for
11: end while
---

Regarding the complexity of Algorithm 1, the analytical solutions of steps 3-6 are efficient to compute. The matrix multiplication and inversion used in Step 5 and Step 6 cost $\mathcal{O}(p^2 m + pmd + d^3)$ and $\mathcal{O}(q^2 n + qnd + d^3)$, respectively. Steps 8-9 are implemented in a batch-learning fashion, and cost $\mathcal{O}(tN)$ to evaluate the gradients, where t is the number of iterations and N is the number of training ratings in R. Considering that N>>max{m,n,d}, the time complexity of Algorithm 1 is mainly determined by $\mathcal{O}(tN)$. Hence, this approach owns a good scalability. To further reduce the computational cost, some advanced distributed optimization algorithms could be applied.

The above approach can be extended to multiple hidden layers using marginalized stacked denoising autoencoders (mSDA), which results in better performance in some instantiations. In accordance with some embodiments, an assumption is made that only one hidden layer should be close to the latent factor. The reasons are two-fold. First, latent factors are high-level representations, which should correspond to the deeper layers in deep learning models. Secondly, latent factors should be unique, but different hidden layers have various representations. Therefore, enforcing the similarity between multiple hidden layers and latent factors is unreasonable.

In accordance with the mSDA-CF model in some embodiments, an assumption is made that the latent factors are generated from the $\lfloor (l+1)/2 \rfloor$ layer, given the total number of layers is l. When the model is trained for the others layers, the parameters, λ, α, and β are simply set to 0. Only $W_1$ and $W_2$ need to be updated for these layers so the other steps from Algorithm 1 are ignored. One benefit of such setting is time efficiency, as computational burden is not increased too much when adding multiple layers. Moreover, another interesting problem is how to set the number of layers. The number of layers implies the model complexity, which is usually related to the learning task and the size of training data.

Figure 4:
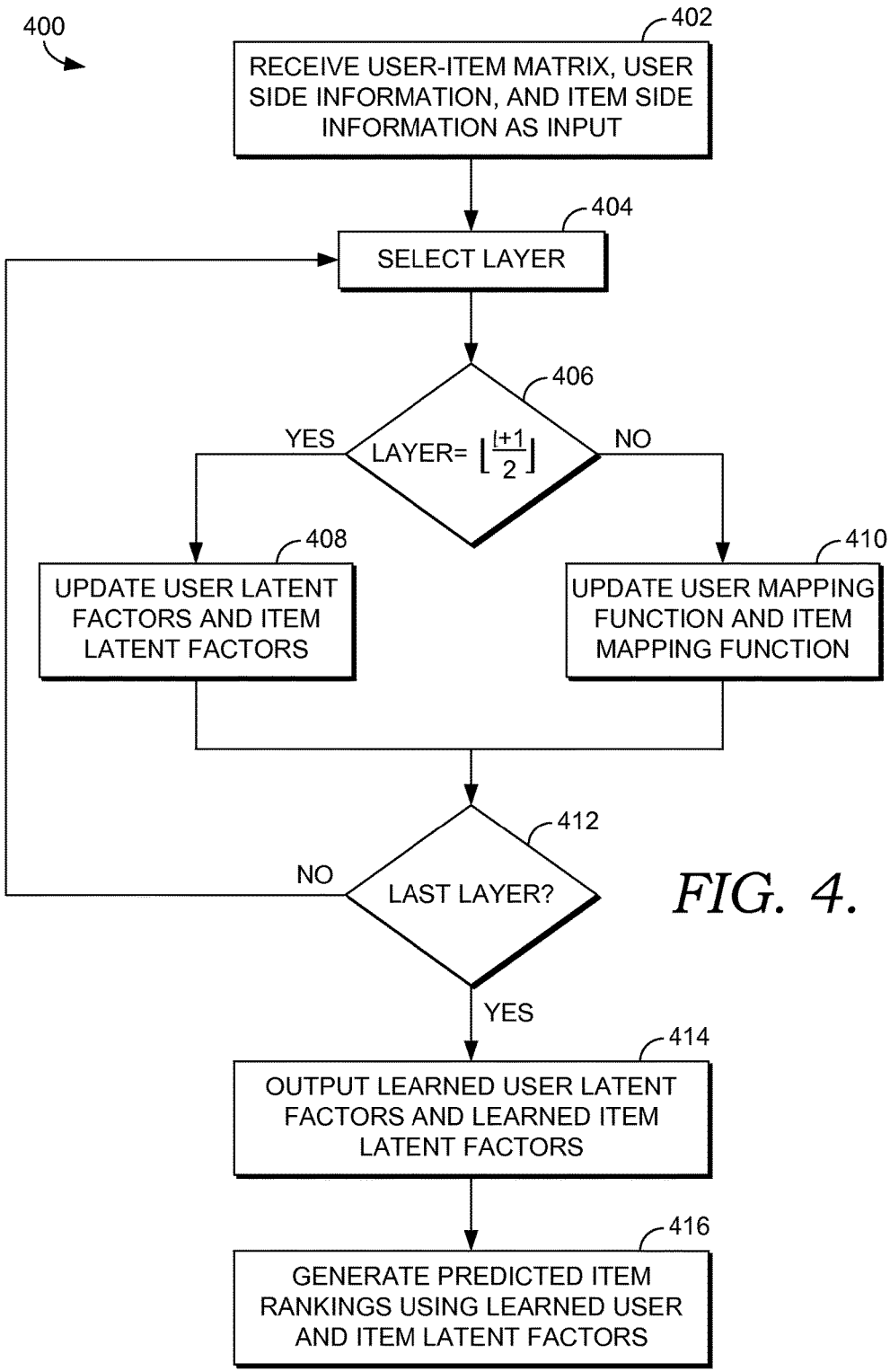
FIG. 4 is a flow diagram showing a method for determining user latent factors and item latent factors using a deep collaborative filtering approach combining probabilistic matrix factorization with marginalized stacked denoising autoencoders in accordance with embodiments of the present invention.

FIG. 4 provides a flow diagram for determining user latent factors and item latent factors using a DCF approach combining PMF with mSDA. As shown at block 402, input is received that includes a user-item rating matrix, user side information, and item side information. Additionally, trade-off parameters may also be received at block 302. The number of layers for the mSDAs may also be specified.

As shown in FIG. 4, the layers are looped through. For each pass, a layer is selected at block 404. If it is determined at block 406 that the currently selected layer is the $\lfloor (l+1)/2 \rfloor$ layer, user latent factors and item latent factors are updated, as shown at block 408. This may be performed, for instance, using the method 300 and Algorithm 1 discussed above.

Alternatively, if the currently selected layer is not the $\lfloor(l+1)/2\rfloor$ layer, the user mapping function and item mapping functions are updated, as shown at block 410. This may be done, for instance, by setting tradeoff parameters (e.g., $\lambda$, $\lambda$, and $\beta$) to zero.

After all the layers have been processed at block 412, learned user latent factors and learned item latent factors are outputted, as shown at block 414. The learned user latent factors and learned item latent factors are then used to generate predicted item ratings for missing entries in the user-item rating matrix, as shown at block 416.

The above approach can be summarized in Algorithm 2 shown below:

---
Algorithm 2: mSDA-CF Algorithm

---
Input: Rating matrix R, user side information X, item side information Y, trade-off parameters $\lambda$, $\alpha$, $\beta$, layers l.
Output: Latent factors U, V
1: for loop 1 : l, do
2:    if loop = $\lfloor(l+1)/2\rfloor$, do
3:       Update U and V using Algorithm 1, by setting valid values to $\lambda$, $\alpha$, and $\beta$;
4:    otherwise
5:       Update $W_1$ and $W_2$ using Algorithm 1, by setting $\lambda = 0$, $\alpha = 0$, and $\beta = 0$;
6:    end if
7: end for

---

Figure 5:
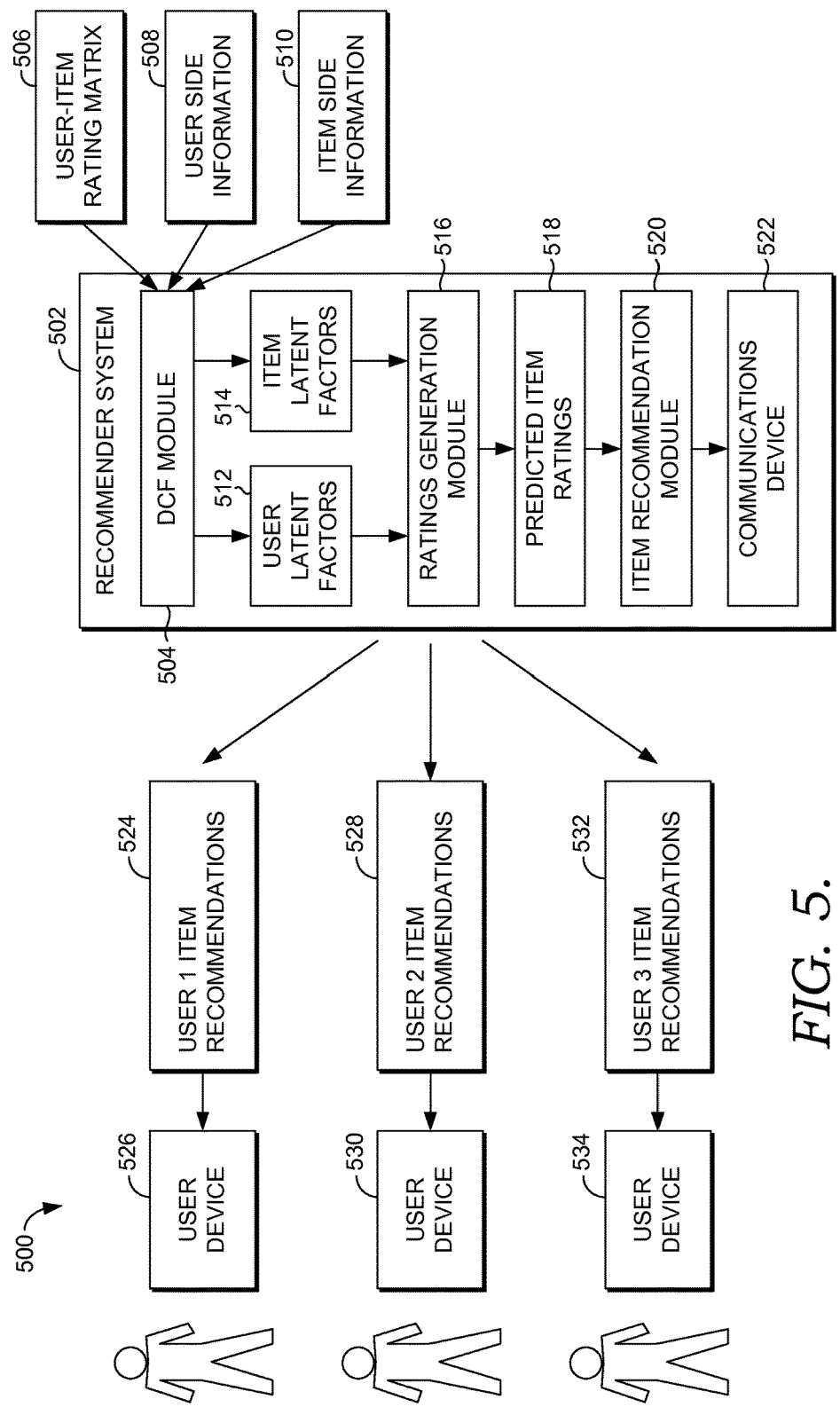
FIG. 5 is a block diagram of an exemplary system architecture in which embodiments of the invention may be employed.

With reference now to FIG. 5, a block diagram is provided illustrating an exemplary system 500 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 500 includes a recommender system 502 operable to select and send item recommendations to user devices. For instance, FIG. 5 illustrates the recommender system 502 providing the user 1 item recommendations 524 being delivered to the user device 526 of a first user, the user 2 item recommendations 528 being delivered to the user device 530 of a second user, and the user 3 item recommendations 532 being delivered to the user device 532. It should be understood that the recommender system 502 may provide item recommendations to any number of users, and the three shown in FIG. 5 are provided by way of example only.

Each of the components shown in FIG. 5 may be implemented via any type of computing device, such as computing device 600 described with reference to FIG. 6, for example. The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of user devices and recommender systems may be employed within the system 500 within the scope of the present invention. Each may comprise a single device or multiple devices cooperating in a distributed environment. For instance, the recommender system 502 may be provided via multiple devices arranged in a distributed environment that collectively provide the functionality described herein. Additionally, other components not shown may also be included within the network environment.

The recommender system 502 includes a DCF module 5004 that utilizes the DCF approach described herein to learn user latent factors 512 and item latent factors 514. As shown in FIG. 5, the DCF module 504 receives input, including a user-item rating matrix 506, user side information 508, and item side information 510. The DCF module 504 utilizes matrix factorization based collaborative filtering combined with mDA to derive the user latent factors 512 and the item latent factors 514. For instance, the DCF module may employ any of the methods 200, 300, or 400.

The user latent factors 512 and the item latent factors 514 are provided to a ratings generation module 516. The ratings generation module employs the user latent factors 512 and the item latent factors to generate predicted item ratings 518 for at least a portion of the missing entries in the user-item rating matrix 506. Predicting item ratings using user latent factors and item latent factors is well known and therefore will not be described in further detail herein.

The predicted item ratings 518 are provided to an item recommendation module 520. The item recommendation module 520 selects item recommendations for a given user based on the predicted item ratings 518. For instance, for the first user associated with user device 526, the item recommendation module 520 retrieves predicted item ratings identified for the first user. The item recommendation module 520 then selects the top N items having the highest predicted item ratings and provides recommendations for those top N items.

The communications device 522 includes hardware (e.g., a network interface controller) operable to communicate item recommendations to a communications network, such as the Internet, in order to transmit the item recommendations to user devices. For instance, as shown in FIG. 5, the user 1 item recommendations 524 are delivered to the user device 526 of a first user, the user 2 item recommendations 528 are delivered to the user device 530 of a second user, and the user 3 item recommendations 532 are delivered to the user device 532.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 6:
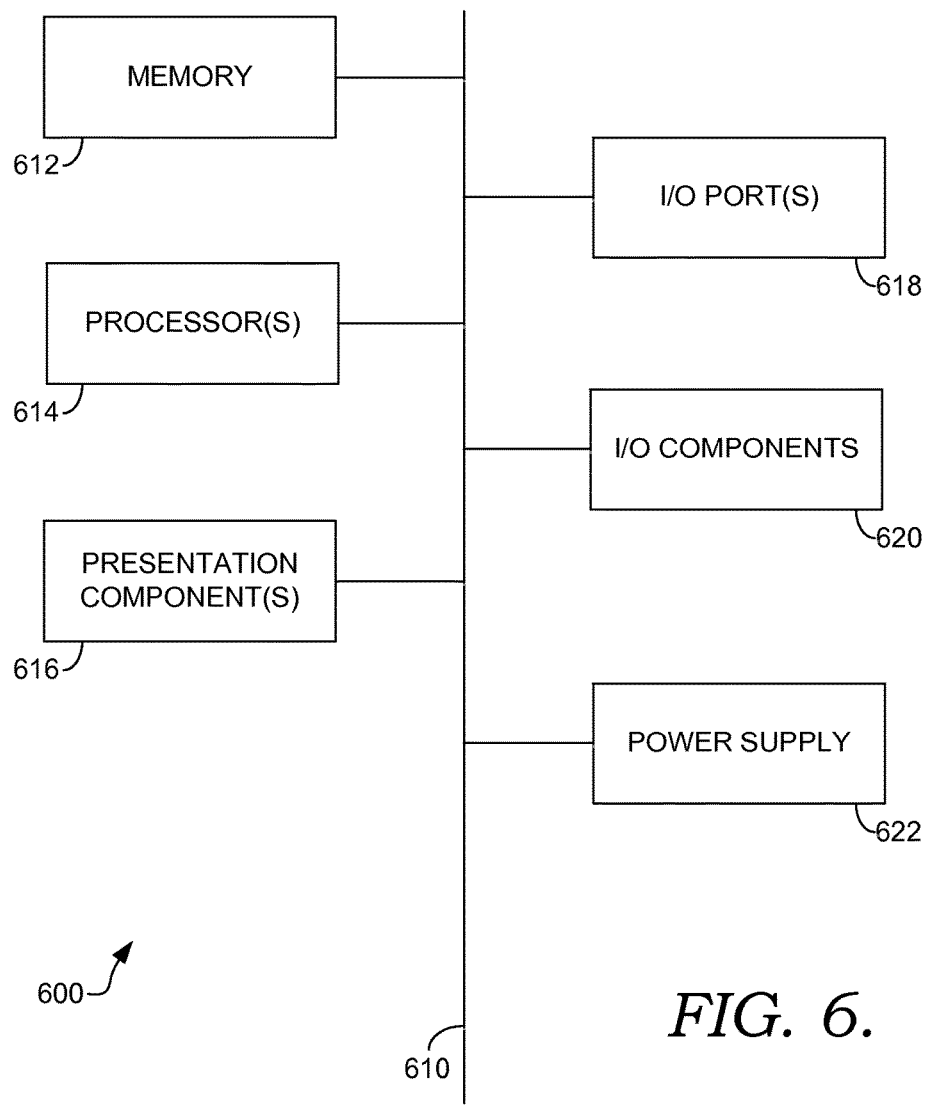
FIG. 6 is a block diagram of an exemplary computing environment suitable for use in implementing embodiments of the present invention.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention are generally directed to providing item recommendations using a recommender system employing a deep collaborative filtering approach that combines deep learning models, namely marginalized denoising autoencoders, with matrix factorization based collaborative filtering. The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention has been described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for providing item recommendations to a user device of a user, the method comprising:

receiving a user-item rating matrix, user side information, and item side information;

generating, using a processor, learned user latent factors and learned item latent factors by jointly:
(1) decomposing the user-item rating matrix to extract latent factors from the user-item rating matrix, and
(2) extracting latent factors from hidden layers of deep learning models using the user side information and item side information as input layers to the deep learning models;

generating predicted item ratings for at least a portion of the missing ratings in the user-item rating matrix using the learned user latent factors and learned item latent factors;

selecting one or more item recommendations for the user based on at least a portion of the predicted item ratings; and communicating, via one or more communication networks, the one or more item recommendations to the user device associated with the user.

2. The computer-implemented method of claim 1, wherein the user-item rating matrix is decomposed using probabilistic matrix factorization, and wherein the deep learning models comprise marginalized denoising autoencoders.

3. The computer-implemented method of claim 1, wherein the user-item rating matrix comprises item ratings, each item rating comprising a rating on a rating scale provided by a given user for a given item, and wherein each predicted item rating comprises a predicted rating on the rating scale.

4. The computer-implemented method of claim 1, wherein the user-item rating matrix comprises item ratings, each item rating indicating whether a given user performed an action for a given item, and wherein each predicted item rating comprises a response prediction.

5. The computer-implemented method of claim 1, wherein jointly decomposing the user-item rating matrix to extract latent factors from the user-item matrix and extracting latent factors from the hidden layers of the deep learning models using the user side information and item side information as input layers comprises:
initializing the user latent factors, the item latent factors, a user projection matrix, and an item projection matrix;
repeating until convergence:
updating a user mapping function as a function of the user side information, the user latent factors, and the user projection matrix,
updating an item mapping function as a function of the item side information, the item latent factors, and the item projection matrix,
updating the user projection matrix as a function of the user side information, the user mapping function, and the user latent factors,
updating the item projection matrix as a function of the item side information, the item mapping function, and the item latent factors,
updating the user latent factors as a function of the user side information, the user projection matrix, and the user mapping function, and
updating the item latent factors as a function of the item side information, the item projection matrix, and the item mapping function; and
upon convergence, outputting the user latent factors and the item latent factors.

6. The computer-implemented method of claim 5, wherein a plurality of layers are employed, wherein the updating steps are performed for a $\lfloor (l+1)/2 \rfloor$ layer in which l represents the number of layers, and wherein only the user mapping function and item mapping function are updated for all other layers.

7. One or more computer storage media storing computer-useable instructions that, when used by one or more computing devices, cause the one or more computing devices to perform operations for predicting item ratings for users, the operations comprising:
receiving as input: a user-item rating matrix, user side information, and item side information;
initializing user latent factors, item latent factors, a user projection matrix, and an item projection matrix;
repeating until convergence:
updating a user mapping function as a function of the user side information, the user latent factors, and the user projection matrix,
updating an item mapping function as a function of the item side information, the item latent factors, and the item projection matrix,
updating the user projection matrix as a function of the user side information, the user mapping function, and the user latent factors,
updating the item projection matrix as a function of the item side information, the item mapping function, and the item latent factors,
updating the user latent factors as a function of the user side information, the user projection matrix, and the user mapping function, and
updating the item latent factors as a function of the item side information, the item projection matrix, and the item mapping function;
upon convergence, outputting learned user latent factors and learned item latent factors; and
generating predicted item ratings for missing entries in the user-item rating matrix based on the learned user latent factors and learned item latent factors.

8. The one or more computer storage media of claim 7, wherein the user mapping function is updated according to the following equation:

$$W_1 = E[S_1]E[Q_1]^{-1},$$

wherein $W_1$ represents the user mapping function, $S_1 = \bar{X}\tilde{X}^T + \lambda P_1 U^T X^T$, and $Q_1 = \bar{X}\tilde{X}^T + \lambda X X^T$, and
wherein X represents the user side information, $\bar{X}$ represents a c-times repeated version of X, $\tilde{X}$ represents a corrupted version of $\bar{X}$, $\lambda$ represents a trade-off parameter, and $P_1$ represents the user projection matrix.

9. The one or more computer storage media of claim 7, wherein the item mapping function is updated according to the following equation:

$$W_2 = E[S_2]E[Q_2]^{-1},$$

wherein $W_2$ represents the item mapping function, $S_2 = \bar{Y}\tilde{Y}^T + \lambda P_2 V^T Y^T$ and $Q_1 = \bar{Y}\tilde{Y}^T + \lambda Y Y^T$, and
wherein Y represents the item side information, $\bar{Y}$ represents a c-times repeated version of Y, $\tilde{Y}$ represents a corrupted version of $\bar{Y}$, $\lambda$ represents a trade-off parameter, and $P_2$ represents the item projection matrix.

10. The one or more computer storage media of claim 7, wherein the user projection matrix is updated according to the following equation:

$$P_1 = W_1 X U (U^T U)^{-1},$$

wherein $P_1$ represents the user projection matrix, $W_1$ represents the user mapping function, X represents the user side information, and U represents the user latent factors.

11. The one or more computer storage media of claim 7, wherein the user projection matrix is updated according to the following equation:

$$P_2 = W_2 Y V (V^T U)^{-1},$$

wherein $P_2$ represents the item projection matrix, $W_2$ represents the item mapping function, Y represents the item side information, and V represents the item latent factors.

12. The one or more computer storage media of claim 7, wherein the user latent factors and item latent factors are updated using the following update rules:

$$u_i = u_i - \gamma \frac{\partial}{\partial u_i} f(U, V),$$

$$v_j = v_j - \gamma \frac{\partial}{\partial v_j} f(U, V)$$

wherein $\gamma$ is a learning rate, and wherein:

$$\frac{\partial f(U, V)}{\partial u_i} = \lambda (P_1^T (P_1 u_i - (W_1 X)_i)) + \beta u_i - \alpha \sum_{(i,j) \in \mathcal{A}} (R_{i,j} - u_i v_j^T) v_j.$$

$$\frac{\partial f(U, V)}{\partial v_j} = \lambda (P_2^T (P_2 v_j - (W_2 Y)_j)) + \beta v_j - \alpha \sum_{(i,j) \in \mathcal{A}} (R_{i,j} - u_i v_j^T) u_i.$$

wherein $u_i$ represents user latent factors for a user i, $\lambda$, $\beta$, and $\alpha$ represents trade-off parameters, $P_1$ represents the user projection matrix, $W_1$ represents the user mapping function, X represents the user side information, $v_j$ represents item latent factors for an item j, $P_2$ represents the item projection matrix, $W_2$ represents the item mapping function, Y represents the item side information, and $R_{i,j}$ represents an user item rating for a user i and item j.

13. The one or more computer storage media of claim 7, wherein the operations further comprise:
  selecting one or more item recommendations for a user based on at least a portion of the predicted item ratings; and
  communicating, via one or more communication networks, the one or more item recommendations to a user device associated with the user.

14. The one or more computer storage media of claim 7, wherein the user-item rating matrix comprises item ratings, each item rating indicating whether a given user performed an action for a given item, and wherein each predicted item rating comprises a response prediction.

15. The one or more computer storage media of claim 7, wherein a plurality of layers are employed, wherein the updating steps are performed for a $\lfloor (l+1)/2 \rfloor$ layer in which l represents the number of layers, and wherein only the user mapping function and item mapping function are updated for all other layers.

16. A computerized system for providing item recommendations to a user device of a user, the system comprising:
  one or more processors; and
  one or more computer storage media comprising computer-useable instructions for causing the one or more processors to perform operations, the operations comprising:
    receiving a user-item rating matrix, user side information, and item side information;
    generating learned user latent factors and learned item latent factors by jointly:
      (1) decomposing the user-item rating matrix to extract latent factors from the user-item rating matrix, and
      (2) extracting latent factors from hidden layers of deep learning models using the user side information and item side information as input layers to the deep learning models;
    generating predicted item ratings for missing ratings in the user-item rating matrix using the learned user latent factors and learned item latent factors;
    selecting one or more item recommendations for the user based on at least a portion of the predicted item ratings; and
    communicating, via one or more communication networks, the one or more item recommendations to the user device associated with the user.

17. The computerized system of claim 16, wherein the user-item rating matrix is decomposed using probabilistic matrix factorization, and wherein the deep learning models comprise marginalized denoising autoencoders.

18. The computerized system of claim 16, wherein the user-item rating matrix comprises item ratings, each item rating indicating whether a given user performed an action for a given item, and wherein each predicted item rating comprises a response prediction.

19. The computerized system of claim 16, wherein jointly decomposing the user-item rating matrix to extract latent factors from the user-item rating matrix and extracting latent factors from the hidden layers of the deep learning models using the user side information and item side information as input layers comprises:
  initializing the user latent factors, the item latent factors, a user projection matrix, and an item projection matrix;
  repeating until convergence:
    updating a user mapping function as a function of the user side information, the user latent factors, and the user projection matrix,
    updating an item mapping function as a function of the item side information, the item latent factors, and the item projection matrix,
    updating the user projection matrix as a function of the user side information, the user mapping function, and the user latent factors,
    updating the item projection matrix as a function of the item side information, the item mapping function, and the item latent factors,
    updating the user latent factors as a function of the user side information, the user projection matrix, and the user mapping function, and
    updating the item latent factors as a function of the item side information, the item projection matrix, and the item mapping function; and
  upon convergence, outputting the user latent factors and the item latent factors.

20. The computerized system of claim 19, wherein a plurality of layers are employed, wherein the updating steps are performed for a $\lfloor (l+1)/2 \rfloor$ layer in which l represents the number of layers, and wherein only the user mapping function and item mapping function are updated for all other layers.

* * * * *

UNITED STATES PATENT AND TRADEMARK OFFICE
CERTIFICATE OF CORRECTION

PATENT NO. : 10,255,628 B2
APPLICATION NO. : 14/934294
DATED : April 9, 2019
INVENTOR(S) : Sheng Li et al.

It is certified that error appears in the above-identified patent and that said Letters Patent is hereby corrected as shown below:

On the Title Page

Item (72), Inventors, Line 1, delete "AS" and insert -- MA --, therefor.

In the Specification

In Column 4, Line 63, delete "L(X,U)" and insert -- $\mathscr{L}(X,U)$ --, therefor.

In Column 4, Line 64, delete "L(Y,V)" and insert -- $\mathscr{L}(Y,V)$ --, therefor.

In Column 5, Line 59 (approx.), delete "X and Y" and insert -- $\tilde{X}$ and $\tilde{Y}$ --, therefor.

In Column 5, Lines 62-63 (approx.), delete "$l(R,U,V)=\|A\odot(R-UV^T)\|_F^2$" and insert -- $l(R,U,V) = \|A\odot(R-UV^\top)\|_F^2$ --, therefor.

In Column 6, Line 17 (approx.), delete "$L_U(W_1,P_1,U)$" and insert -- $\mathscr{L}_U(W_1,P_1,U)$ --, therefor.

In Column 6, Line 43 (approx.), delete "$S_1=\tilde{X}\tilde{X}^T+\lambda P_1 U^T X^T$ and $Q_1=\tilde{X}X^T+\lambda XX^T$." and insert -- $S_1 = X\tilde{X}^\top + \lambda P_1 U^T X^T$ and $Q_1 = X\tilde{X}^\top + \lambda XX^T$ --, therefor.

In Column 6, Line 50 (approx.), delete "$S_2=\tilde{Y}Y^T+\lambda P_2 V^T Y^T$ and $Q_1=\tilde{Y}Y^T+\lambda YY^T$." and insert -- $S_2 = \tilde{Y}\tilde{Y}^\top + \lambda P_2 V^\top Y^\top$ and $Q_1 = \tilde{Y}\tilde{Y}^\top + \lambda YY^\top$ --, therefor.

In Column 6, Line 60 (approx.), delete "$P_1=W_1XU(U^TU)^{-1}$" and insert -- $P_1 = W_1XU(U^\top U)^{-1}$ --, therefor.

Signed and Sealed this
Twelfth Day of May, 2020

Andrei Iancu
*Director of the United States Patent and Trademark Office*

CERTIFICATE OF CORRECTION (continued)

In Column 6, Line 63 (approx.), delete "$(V^TU)^{-1}$" and insert --$(V^\top V)^{-1}$--, therefor.

In Column 9, Line 4, delete "λ, λ," and insert -- λ, α, --, therefor.

In the Claims

In Column 14, Line 43-44 (approx.), Claim 8, delete

"$S_1 = X\hat{X}^T + \lambda P_1 U^T X^T$, and $Q_1 = X\hat{X}^T + \lambda XX^T$," and insert --$S_1 = \bar{X}\tilde{X}^\top + \lambda P_1 U^\top X^\top$, and $Q_1 = \bar{X}\tilde{X}^\top + \lambda XX^\top$,--, therefor.

In Column 14, Line 54-55 (approx.), Claim 9, delete

"$S_2 = Y\hat{Y}^T + \lambda P_2 V^T Y^T$ and $Q_1 = Y\hat{Y}^T + \lambda YY^T$," and insert --$S_2 = \bar{Y}\tilde{Y}^\top + \lambda P_2 V^\top Y^\top$ and $Q_1 = \bar{Y}\tilde{Y}^\top + \lambda YY^\top$,--, therefor.

In Column 14, Line 63 (approx.), Claim 10, delete "$W_1 XU(U^TU)^{-1}$," and insert --$W_1 XU\,(U^\top U)^{-1}$,--, therefor.

In Column 15, Line 4 (approx.), Claim 11, delete "$P_2 = W_2 YV(V^TU)^{-1}$," and insert --$P_2 = W_2 YV\,(V^\top V)^{-1}$,--, therefor.